F. A. WHITE.
MACHINE FOR DISPENSING ICE CREAM.
APPLICATION FILED SEPT. 2, 1919.

1,347,727.

Patented July 27, 1920.
4 SHEETS—SHEET 1.

INVENTOR
Frank A. White
BY John A. Bommhardt
ATT'Y.

F. A. WHITE.
MACHINE FOR DISPENSING ICE CREAM.
APPLICATION FILED SEPT. 2, 1919.

1,347,727.

Patented July 27, 1920.

4 SHEETS—SHEET 4.

INVENTOR,
Frank A. White

By John A. Bommhardt
ATTY.

UNITED STATES PATENT OFFICE.

FRANK A. WHITE, OF CLEVELAND, OHIO, ASSIGNOR OF ONE-HALF TO ARTHUR H. VOIGT, OF CLEVELAND, OHIO.

MACHINE FOR DISPENSING ICE-CREAM.

1,347,727.            Specification of Letters Patent.      Patented July 27, 1920.

Application filed September 2, 1919. Serial No. 321,254.

*To all whom it may concern:*

Be it known that I, FRANK A. WHITE, a citizen of the United States, residing at Cleveland, in the county of Cuyahoga and State of Ohio, have invented certain new and useful Improvements in Machines for Dispensing Ice-Cream, of which the following is a specification.

This invention relates to a machine for dispensing ice cream and it has for its object to provide a machine which will cut the cream in the desired form, insert it within a container formed of dough similar to that used in the present type of cone, and deliver the finished product to the consumer in a clean and sanitary manner.

The invention comprises suitable mechanisms and combinations of parts which will be more fully described and pointed out in the accompanying descriptions and claims.

Figure 1:
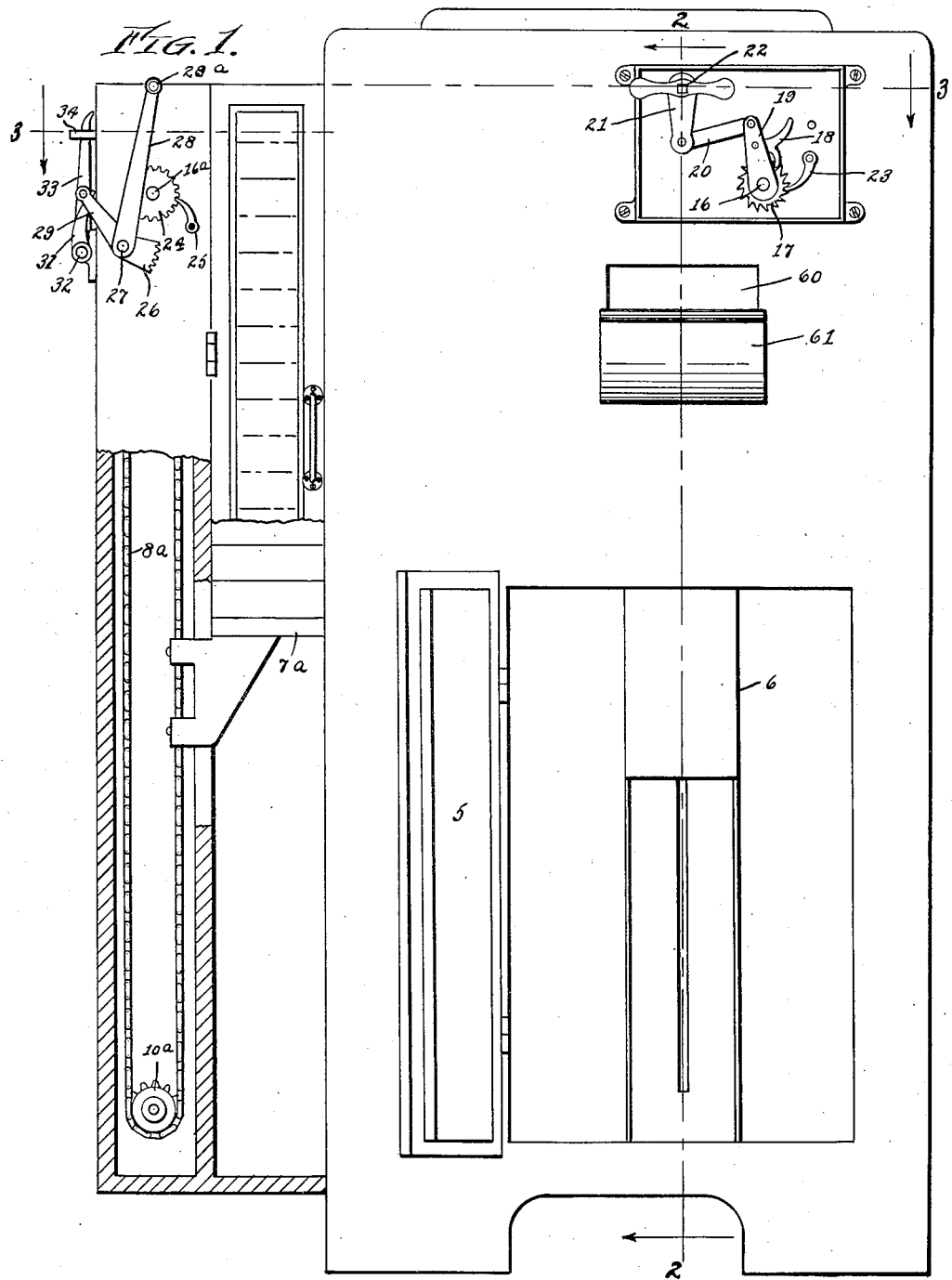
Figure 2:
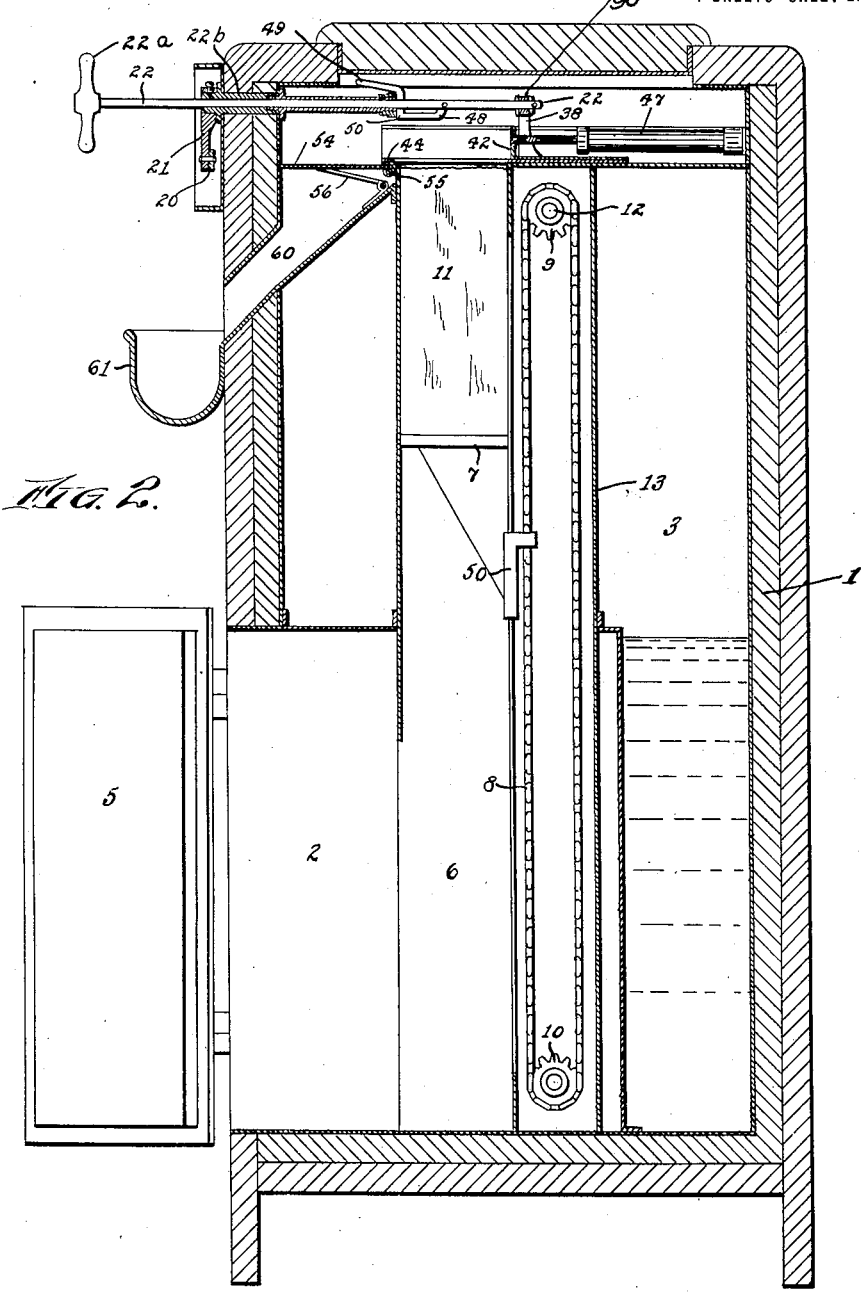
Figure 3:
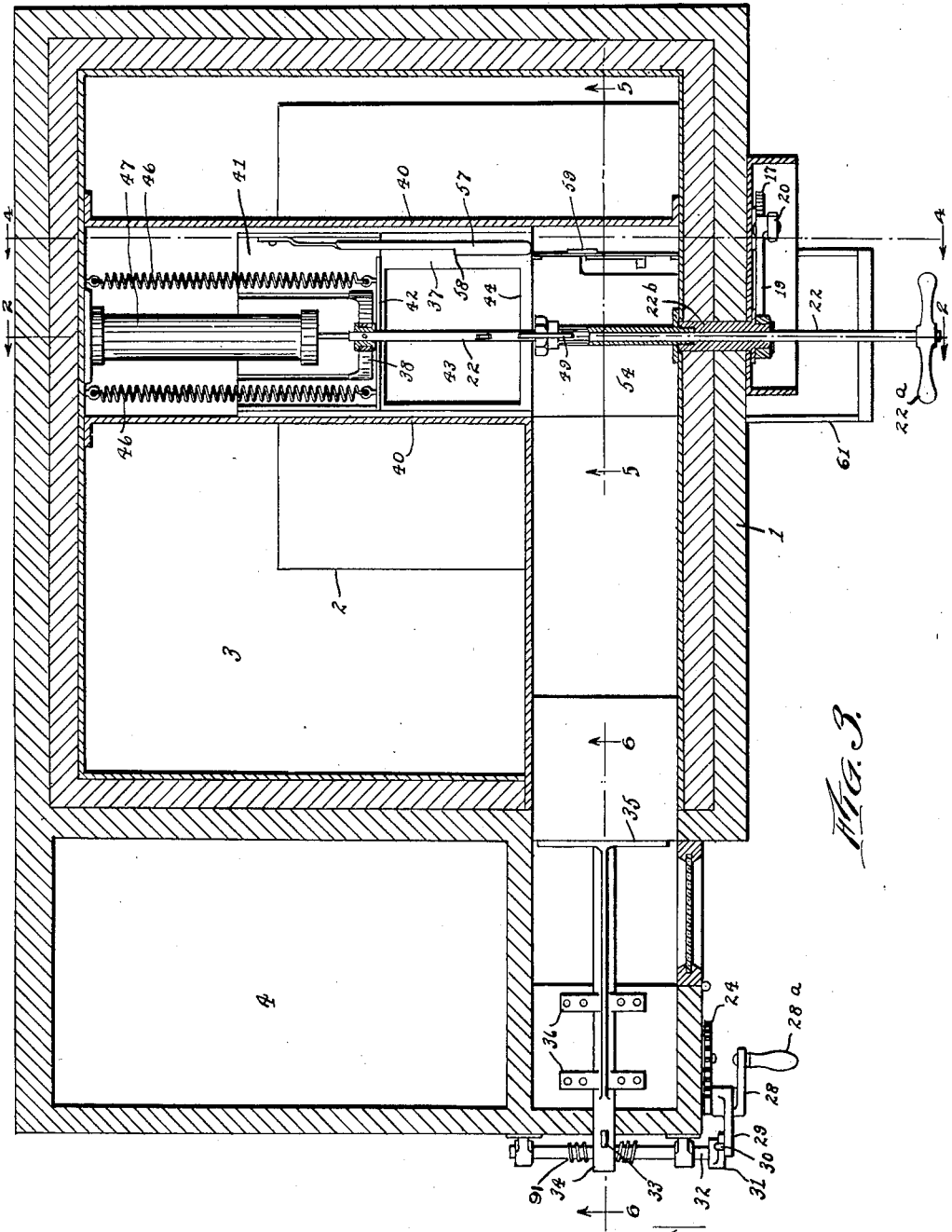
Figure 4:
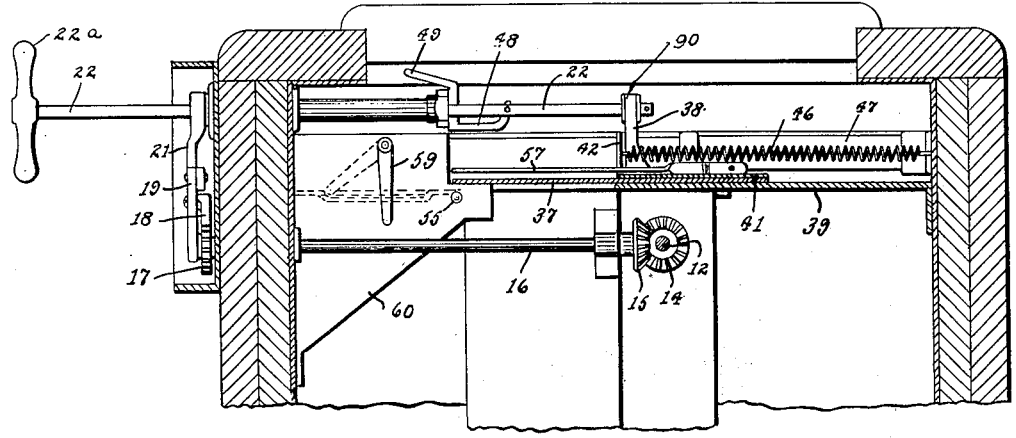
Figure 5:
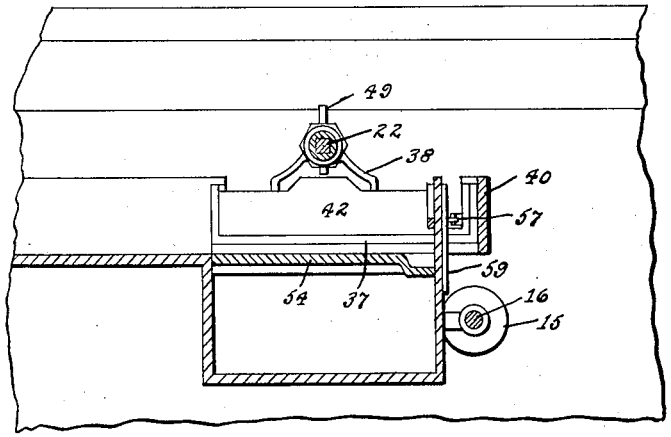
Figure 6:
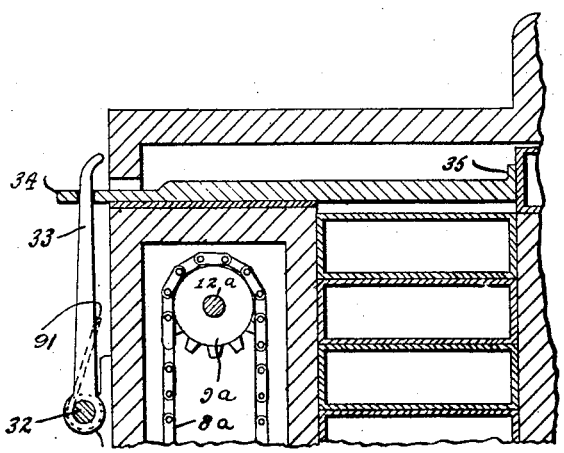

Reference is made to the annexed drawings wherein Figure 1 is a front elevation of the device, certain parts being broken away for convenience of illustration: Fig. 2 is a vertical section on the line 2—2 of Figs. 1 and 3: Fig. 3 is a horizontal section on the line 3—3 of Fig. 1; Figs. 4, 5 and 6 are detail sections corresponding to the lines 4, 5 and 6 of Fig. 3.

Describing the parts by reference numerals: 1 represents an ice chest of suitable construction and provided with compartments 2, 3 and 4. The compartment 2 opens at the front of the chest through a swing door 5 and provides a means for storing and containing the bricks of ice cream. The compartment 3 surrounds the compartment 2 and acts to contain the refrigerating medium, while the compartment 4 is merely a convenient place for storing surplus containers.

Located within the compartment 2 is a chute 6 which extends from the bottom thereof substantially to the top, and said chute has slidably mounted therein a shelf 7 which has a connection 50 with an endless chain 8 mounted upon sprocket wheels 9 and 10 and located in the rear of said chute, the sprocket 9 being driven and by means to be hereinafter described causes the shelf 7 to rise, carrying with it a brick of ice cream 11 previously placed thereon. The sprocket 9 is mounted upon a horizontal shaft 12 suitably supported in bearings formed as part of the housing 13 which separates the refrigerant from the operating parts and said shaft has fixed to its end a bevel gear 14 which meshes with a like gear 15 secured upon a transverse shaft 16, supported upon the chute and projecting through the front of the chest 1 where it has secured to it a ratchet wheel 17, said ratchet wheel being adapted to be given an intermittent movement through a pawl 18 carried upon an arm 19 supported upon its end upon the shaft 16 and having its opposite end pivotally secured through a link 20 to a crank 21 fixed against rotation upon a main operating shaft 22 hereinafter described. A detent pawl 23 prevents the ratchet 17 from allowing any backward movement of the shaft 16 when a brick of ice cream is upon the shelf, and this detent may be manually freed from the ratchet when it is desired to retrieve the parts in such a manner as to allow the insertion of a new brick of ice cream upon the shelf 7.

As viewed in Fig. 1 at the left of the chest is mechanism for storing and feeding the containers, one at a time, to the proper location for receiving the ice cream and which consists of an elevating means similar to that employed for lifting the cream, the parts which are identical bearing like reference numerals with the added suffix "a". The driving shaft $12^a$, suitably supported, has fixed thereon the sprocket $9^a$ to which the elevator chain is attached and to that end which projects through the chest 1 has affixed a gear 24 and said shaft is prevented from any reverse movement by a spring pressed pawl 25 which engages the teeth of the gear 24. This gear is intermittently rotated by a gear segment 26, secured upon a stub shaft 27, having fixed thereon a crank 28 provided with an operating handle $28^a$, also secured to said stub shaft 27 is a second crank 29 provided at its end with an anti-friction roller 30 which, upon each rotation of the shaft 27 engages a cam arm 31 fixed upon a shaft 32 supported in bearings fastened to the side of the chest 1 and this shaft has affixed intermediate of its bearings a lever arm 33 which has its opposite end projecting through a slot in the arm 34 of a pusher head 35, said head being allowed to reciprocate in a horizontal direction between suitable guides 36 secured to the top of the chest 1. A spring 91 bearing against the arm 33 acts to swing said arm backwardly or outwardly after every advance thereof.

The mechanism for severing the cream in the desired size comprises a cutting plate 37 which lies beneath a similar plate 41, both of which are guided between the side walls 40 of the housing 39. The plate 37 has secured to its upper face a standard 38 which is allowed to operate through slots in the plate 41 and has fixed to its upper end the squared shaft 22, which extends through a sleeve 22$^b$ and within a suitable bearing 90 to the outside of the chest 1, where it has secured to its end the operating handle 22$^a$. The sleeve 22$^b$ allows the shaft to rotate within the bearing to operate the elevator mechanism. The crank 21 is rigidly secured to the rotatable sleeve 22$^b$, which sleeve is rotated through the squared shaft 22 and handle 22$^a$. The interior of the sleeve 22$^b$ is squared so as to accommodate the shaft 22, yet the fit is loose enough to permit longitudinal sliding movement of the shaft 22 in the sleeve. The cutting blade is formed by the plate 37 being provided at its forward end with a squared opening 43 which is equivalent to the cross dimension of the brick of cream, the forward side or edge of the opening being sharpened to provide a cutting edge 44, when the blade is forced rearwardly by the operator pushing the shaft 22 a slice of cream is severed from the brick and is then forced into the container by a pusher 42, which is formed by the upturned forward end of the plate 41. This plate is normally held in a rearward position by two tension springs 46 and is prevented from too quick a return by a pneumatic cushion formed by a piston reciprocating within a cylinder 47. The forward movement of this pusher is obtained by a trigger 48 carried by the shaft 22 which falls by gravity when the arm 49 of the trigger leaves the top of the bearing 90, when the shaft 22 is moved rearwardly and whose portion 50 rides over the top of the head 51 of the pusher and then falls to the rear of the head. As the shaft is drawn forward it carries the pusher with it until the arm 49 of the trigger rides over the bearing 90 and releases the pusher, which returns to its normal position through the action of the springs 46.

After the container has been filled it rests upon a shelf 54 which is pivoted upon a shaft 55 secured to the housing, said shelf comprising in effect a trap door which is normally held closed or in a horizontal position by a torsion spring 56 about the shaft 55 and is opened at the proper time by a release which consists of a trigger 57, having one of its ends secured to the side of the plate 41 and its other end provided with a catch 58 which engages the arm of a bell crank 59 pivotally secured to the housing and the other arm of the bell crank engages the upper face of the shelf and when the pusher mechanism returns causes the shelf to swing about its pivot, allowing the finished product to fall through an opening 60 in the front of the chest 1 and lodge in a cup 61 fastened thereto.

The container comprises a hollow cake substantially square and about one inch in thickness. This cake is closed on all sides but one, which when presented to the slice of cream allows the same to be pushed within, presenting to the consumer a product similar to the sandwich now on the market, but providing against the cream squeezing out at the edges when the sandwich is bitten into.

In operation, the containers are first advanced by operation of the head 35 until the first container is in line with the pusher 42. The handle 22$^a$, shaft 22 and sleeve 22$^b$ are then turned to lift the brick 11 in position to cut off a slice. The shaft 22 is then pushed in, advancing the cutting edge 44 and cutting off a slice. The shaft 22 is then pulled out to full extent and the pusher 42 (being then engaged by the trigger 48) is advanced and pushes the slice into the container. The pusher is then returned by the springs 46, to original position, and the crank 59 is then operated by the catch 58 to open the trap door 54 and drop the container through the delivery spout 60.

I claim:

1. In a dispensing machine the combination of an upright chute adapted to hold a body of material, a lifting mechanism in said chute adapted to lift said body to extend a portion thereof beyond the chute, a magazine for containers located beside the chute, means to lift the containers in the magazine to position successively beside the top of the chute, a cutting mechanism working transversely across the top of the chute and adapted to sever a portion of the said body of material, means to advance the portion so severed into the adjacent container, and means to discharge the filled container from the machine.

2. In an ice-cream dispensing mechanism the combination of a magazine for holding bricks of cream, a refrigerating chamber about said magazine, an elevating device working in said magazine and adapted to lift the block through an opening in the top of the magazine, to expose a portion of said block, a cutting blade movable across said opening in the magazine and adapted to sever the exposed portion of the brick, a pusher movable with the blade, a magazine for containers, means to advance the containers from the magazine to position successively in line with the pusher, means to advance the pusher to deposit the severed portion into the foremost container, and means to deliver said container from the machine.

3. In an ice cream dispensing machine the combination of an upright chute having an opening at the top, means to elevate a brick of cream to successively expose portions thereof above the top of the chute, a combined cutter and pusher working in one direction across the top of the chute and adapted to sever a portion of the ice cream, means to feed containers successively into the line of movement of the pusher, means to operate the combined cutter and pusher whereby advance of the pusher will deposit the portion so severed into a container, and means to deliver the container containing said portion.

4. In a machine for dispensing ice cream, the combination of an upright chute having its mouth at the top, means to advance a block of cream upwardly in the chute to extend a portion thereof beyond said mouth, a combined cutting and pushing mechanism movable across said mouth, and having a cutting blade and a pusher, with an opening therebetween corresponding to the mouth of the chute, means to move the said mechanism across the mouth of the chute, means to feed containers successively into position beside said mouth and in line with the movement of the pusher, whereby the pusher will deposit a severed portion into the container, and means to deliver the container so filled from the machine.

5. In an ice cream dispensing machine the combination of an upright chute having its mouth at the top, an elevator in the chute adapted to raise a block of ice cream therein, step by step through said mouth, means to operate the elevating device, a reciprocating combined cutter and pusher movable horizontally across said mouth, a magazine for containers, means to advance containers therefrom one by one into position beside the mouth of the chute in line with the pusher, means to operate the combined cutter and pusher whereby forward movement of the pusher will fill a container with the severed portion of ice cream, and means to deliver the said container from the machine.

In testimony whereof, I do affix my signature in presence of two witnesses.

FRANK A. WHITE.

Witnesses:
JOHN A. BOMMHARDT,
EUGENE A. CANNING.